United States Patent
Au et al.

(10) Patent No.: US 7,392,354 B1
(45) Date of Patent: Jun. 24, 2008

(54) MULTI-QUEUE FIFO MEMORY DEVICES THAT SUPPORT A BACKED-OFF STANDARD MODE OF OPERATION AND METHODS OF OPERATING SAME

(75) Inventors: Mario Au, Fremont, CA (US); Jason Zhi-Cheng Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 311 days.

(21) Appl. No.: 11/144,881

(22) Filed: Jun. 3, 2005

Related U.S. Application Data

(63) Continuation-in-part of application No. 11/044,413, filed on Jan. 27, 2005.

(60) Provisional application No. 60/642,776, filed on Jan. 10, 2005.

(51) Int. Cl.
G06F 12/00 (2006.01)
G06F 13/00 (2006.01)
G06F 13/28 (2006.01)

(52) U.S. Cl. .................. 711/154; 711/100; 711/104
(58) Field of Classification Search .............. 711/109
See application file for complete search history.

(56) References Cited

U.S. PATENT DOCUMENTS

| | | |
|---|---|---|
| 4,486,854 A | 12/1984 | Yuni |
| 4,873,666 A | 10/1989 | Lefebvre et al. |
| 4,888,739 A | 12/1989 | Frederick et al. |
| 5,079,693 A | 1/1992 | Miller |
| 5,084,891 A | 1/1992 | Ariyavisitakul et al. |
| 5,506,809 A | 4/1996 | Csoppenszky et al. |
| 5,508,679 A | 4/1996 | McClure |
| 5,513,376 A | 4/1996 | Lohmeyer |
| 6,044,418 A | 3/2000 | Muller |
| 6,055,588 A | 4/2000 | Steinmetz et al. |
| 6,145,061 A | 11/2000 | Garcia et al. |
| 6,381,659 B2 | 4/2002 | Proch et al. |
| 6,525,980 B1 | 2/2003 | Au et al. |
| 6,567,094 B1 | 5/2003 | Curry et al. |

(Continued)

FOREIGN PATENT DOCUMENTS

JP   2004-139377 A   5/2004

OTHER PUBLICATIONS

Cypress Semiconductor Corporation, Designing with CY7C436xx Synchronous FIFOs, Aug. 4, 2000, 10 pages.
"3.3 Volt CMOS SyncFIFO™ IDT72V205", IDT, Santa Clara, CA, Feb. 2002, 25 pages.
Invitation to Pay Additional Fees, Annex to Form PCT/ISA/206, Communication Relating to the Results of the Partial International Search, PCT/US04/19152, Oct. 27, 2004.

*Primary Examiner*—Hyung Sough
*Assistant Examiner*—Gary W Cygiel
(74) *Attorney, Agent, or Firm*—Myers Bigel Sibley & Sajovec

(57) ABSTRACT

Multi-Q FIFO memory devices are configured to support a backed-off standard (BOS) mode of operation. This mode of operation enables automatic re-reading of at least one data word previously read from a first queue in the FIFO memory chip during a first FIFO read operation, in response to a queue-switch back to the first queue during a second FIFO read operation. To support this mode of operation, a read counter associated with the first queue is backed-off at least one entry position in response to the queue-switch.

5 Claims, 8 Drawing Sheets

U.S. PATENT DOCUMENTS

| | | |
|---|---|---|
| 6,629,226 B1 | 9/2003 | Paul et al. |
| 6,631,455 B1 | 10/2003 | Raza et al. |
| 6,678,759 B2 | 1/2004 | Stockton et al. |
| 6,745,264 B1 | 6/2004 | Luke et al. |
| 6,757,679 B1 | 6/2004 | Fritz |
| 6,795,360 B2 | 9/2004 | Au et al. |
| 7,093,037 B2 | 8/2006 | Duckman |
| 2002/0080672 A1 | 6/2002 | Lee et al. |
| 2003/0018862 A1 | 1/2003 | Karnstedt et al. |
| 2003/0034797 A1 | 2/2003 | Bentz |
| 2003/0120842 A1 | 6/2003 | Bace |
| 2003/0141897 A1* | 7/2003 | Bentz .......................... 326/38 |
| 2006/0017497 A1 | 1/2006 | Mo et al. |
| 2006/0018170 A1 | 1/2006 | Au et al. |
| 2006/0018176 A1 | 1/2006 | Au et al. |
| 2006/0018177 A1 | 1/2006 | Au et al. |
| 2006/0020741 A1 | 1/2006 | Au et al. |
| 2006/0020742 A1 | 1/2006 | Au et al. |
| 2006/0020743 A1 | 1/2006 | Au et al. |
| 2006/0020761 A1* | 1/2006 | Au et al. ..................... 711/155 |
| 2006/0155940 A1 | 7/2006 | Au et al. |

* cited by examiner

MULTI-QUEUE FIFO MEMORY DEVICES THAT SUPPORT A BACKED-OFF STANDARD MODE OF OPERATION AND METHODS OF OPERATING SAME

REFERENCE TO PRIORITY APPLICATION

This application is a continuation-in-part (CIP) of U.S. application Ser. No. 11/044,413, filed Jan. 27, 2005, which claims priority to U.S. Provisional Application Ser. No. 60/642,776, filed Jan. 10, 2005, the disclosures of which are hereby incorporated herein by reference.

FIELD OF THE INVENTION

The present invention relates to integrated circuit memory devices and methods of operating same, and more particularly to buffer memory devices and methods of operating buffer memory devices.

BACKGROUND OF THE INVENTION

Semiconductor memory devices can typically be classified on the basis of memory functionality, data access patterns and the nature of the data storage mechanism. For example, distinctions are typically made between read-only memory (ROM) devices and read-write memory (RWM) devices. The RWM devices typically have the advantage of offering both read and write functionality with comparable data access times. Typically, in RWM devices, data is stored either in flip-flops for "static" memory devices or as preset levels of charge on a capacitor in "dynamic" memory devices. As will be understood by those skilled in the art, static memory devices retain their data as long as a supply of power is maintained, however, dynamic memory devices require periodic data refreshing to compensate for potential charge leakage. Because RWM devices use active circuitry to store data, they belong to a class of memory devices known as "volatile" memory devices because data stored therein will be lost upon termination of the power supply. ROM devices, on the other hand, may encode data into circuit topology (e.g., by blowing fuses, removing diodes, etc.). Since this latter type of data storage may be hardwired, the data cannot be modified, but can only be read. ROM devices typically belong to a class of memory devices known as "nonvolatile" memory devices because data stored therein will typically not be lost upon termination of the power supply. Other types of memory devices that have been more recently developed are typically referred to as nonvolatile read-write (NVRWM) memory devices. These types of memory devices include EPROM (erasable programmable read-only memory), $E^2PROM$ (electrically erasable programmable read-only memory), and flash memories, for example.

An additional memory classification is typically based on the order in which data can be accessed. Here, most memory devices belong to the random-access class, which means that memory locations can be read from or written to in random order, typically by supplying a read or write address. Notwithstanding the fact that most memory devices provide random-access, typically only random-access RWM memories use the acronym RAM. Alternatively, memory devices may restrict the order of data access to achieve shorter data access times, reduce layout area and/or provide specialized functionality. Examples of such specialized memory devices include buffer memory devices such as first-in first-out (FIFO) memory devices, last-in first-out (LIFO or "stack") memory devices, shift registers and content addressable memory (CAM) devices.

A final classification of semiconductor memories is based on the number of input and output ports associated with the memory cells therein. For example, although most memory devices have unit cells therein that provide only a single port which is shared to provide an input and output path for the transfer of data, memory devices with higher bandwidth requirements often have cells therein with multiple input and output ports. However, the addition of ports to individual memory cells typically increases the complexity and layout area requirements for these higher bandwidth memory devices.

Single-port memory devices are typically made using static RAM cells if fast data access times are requiring, and dynamic RAM cells if low cost is a primary requirement. Many FIFO memory devices use dual-port RAM-based designs with self-incrementing internal read and write pointers to achieve fast fall-through capability. As will be understood by those skilled in the art, fall-through capability is typically measured as the time elapsing between the end of a write cycle into a previously empty FIFO and the time an operation to read that data may begin. Exemplary FIFO memory devices are more fully described and illustrated at section 2.2.7 of a textbook by A. K. Sharma entitled "Semiconductor Memories: Technology, Testing and Reliability", IEEE Press (1997).

In particular, dual-port SRAM-based FIFOs typically utilize separate read and write pointers to advantageously allow read and write operations to occur independently of each other and achieve fast fall-through capability since data written into a dual-port SRAM FIFO can be immediately accessed for reading. Since these read and write operations may occur independently, independent read and write clocks having different frequencies may be provided to enable the FIFO to act as a buffer between peripheral devices operating at different rates. Unfortunately, a major disadvantage of typical dual-port SRAM-based FIFOs is the relatively large unit cell size for each dual-port SRAM cell therein. Thus, for a given semiconductor chip size, dual-port buffer memory devices typically provide less memory capacity relative to single-port buffer memory devices. For example, using a standard DRAM cell as a reference unit cell consuming one (1) unit of area, a single-port SRAM unit cell typically may consume four (4) units of area and a dual-port SRAM unit cell typically may consume sixteen (16) units of area. Moreover, the relatively large unit cells of a dual-port SRAM FIFO may limit the degree to which the number of write operations can exceed the number of read operations, that is, limit the capacity of the FIFO.

To address these limitations of dual-port buffer memory devices, single-port buffer memory devices have been developed to, among other things, achieve higher data capacities for a given semiconductor chip size. For example, U.S. Pat. No. 5,546,347 to Ko et al. entitled "Interleaving Architecture And Method For A High Density FIFO", assigned to the present assignee, discloses a memory device which has high capacity and uses relatively small single-port memory cells. However, the use of only single port memory cells typically precludes simultaneous read and write access to data in the same memory cell, which means that single-port buffer memory devices typically have slower fall-through time than comparable dual-port memory devices. Moreover, single-port buffer memory devices may use complicated arbitration hardware to control sequencing and queuing of reading and writing operations.

U.S. Pat. No. 5,371,708 to Kobayashi also discloses a FIFO memory device containing a single-port memory array, a read data register for holding read data from the memory array and a write data register for holding write data to the memory array. A bypass switch is provided for transferring data from the write data register to the read data register so that the memory array can be bypassed during testing of the FIFO to detect the presence of defects therein. However, like the above-described single-port buffer memory devices, simultaneous read and write access to data is not feasible.

Commonly assigned U.S. Pat. Nos. 5,978,307, 5,982,700 and 5,999,478 disclose memory buffers having fast fall-through capability. These memory buffers contain a tri-port memory array of moderate capacity having nonlinear columns of tri-port cells therein which collectively form four separate registers, and a substantially larger capacity supplemental memory array (e.g., DRAM array) having cells therein with reduced unit cell size. The tri-port memory array has a read port, a write port and a bidirectional input/output port. The tri-port memory array communicates internally with the supplemental memory array via the bidirectional input/output port and communicates with external devices (e.g., peripheral devices) via the read and write data ports. Efficient steering circuitry is also provided by a bidirectional crosspoint switch that electrically couples terminals (lines IO and IOB) of the bidirectional input/output port in parallel to bit lines (BL and BLB) in the supplemental memory array during a write-to-memory time interval and vice versa during a read-from-memory time interval. Commonly assigned U.S. Pat. No. 6,546,461 also discloses FIFO memory devices that use multiple multi-port caches to support high rate reading operations.

In order to increase the capacity of FIFO memory devices, multiple FIFO memory devices may be cascaded in a depth expansion configuration. As illustrated by FIG. 1A, a pair of FIFO memory devices may be configured to provide a higher capacity FIFO system 10. In this system 10, both devices operate in a conventional first-word fall-through (FWFT) mode. When disposed in the FWFT mode (pin FWFT=Vdd), the output ready pin (/OR) is used to indicate whether or not there is valid data at the data outputs (Qn) and the input ready pin (/IR) is used to indicate whether or not a FIFO memory device has any free space to support a writing operation. In the FWFT mode, the first word written to an empty FIFO memory device goes directly to the corresponding data outputs (Qn) after three rising edges of the read clock (RCLK) and any requirement that the read enable signal (/REN) be low to produce output data is not necessary.

The FIFO memory device on the left side of FIG. 1A has a write interface and a read interface. The write interface receives a write clock signal WCLK, a write enable signal (/WEN) and input data (Dn) and generates the input ready flag (/IR). The read interface receives a read clock signal RCLK and a read enable signal (/REN) and generates an output ready flag (/OR) and output data (Qn). This output ready flag (/OR) may be used as the write enable input signal (/WEN) to the next stage in the cascaded arrangement. The read interface of the left FIFO memory device is electrically coupled to a write interface of the FIFO memory device on the right side of FIG. 1A and the read and write clock signal pins at these interfaces receive a transfer clock (TRANSFER CLOCK). This transfer clock may be an independent clock signal or may constitute the write clock signal or read clock signal. A transfer clock signal operating a maximum frequency is preferred. However, if the write or read clock signal is used in place of the transfer clock signal, then the read or write clock signal having the higher frequency should be used. The read interface of the right FIFO memory device can be electrically coupled to a downstream peripheral device (not shown) or other device or system.

Unfortunately, the ability to increase the capacity of FIFO memory devices operating in the FWFT mode of operation does not translate to FIFO memory devices that are configured to operate in standard mode, which is another conventional mode of operation. This is because an empty flag (/EF) generated at an output of a FIFO memory device in standard mode may not be used as a write enable signal (/WEN) to the next stage in a cascaded arrangement. This is because there is a one cycle difference between the empty flag (/EF) and the output ready flag (/OR) when a FIFO memory device is disposed in the standard mode and FWFT mode, respectively. This one cycle difference in flag generation precludes reliable operation of a depth expansion arrangement of FIFO memory devices when they are disposed in the standard mode. Thus, as illustrated by FIG. 1B, a FIFO memory device 12 that is disposed in a conventional standard mode (pin FWFT=GND) cannot be arranged in a depth expansion configuration.

FIG. 2 illustrates a conventional multi-Q FIFO memory system 100 having a plurality of multi-Q first-in first-out (FIFO) memory chips therein. These chips, which are identified by the labels Device 1, Device 2, ..., Device n, are responsive to respective ID codes, which are shown as 3-bit codes ID1[2;0], ID2[2:0], ..., IDn[2:0]. Because these 3-bit codes are unique to each device, the multi-Q FIFO memory system 100 is limited to a maximum of $2^3=8$ devices, which provides for a queue expansion of up to a maximum of 256 queues for the case where the write and read addresses (WRADD, RDADSD) are 8-bits wide and a maximum of 32 queues ($2^{(8-3)}$) can be allocated within each device. These and other aspects of the FIFO memory system 100 are illustrated and described at page 79 and elsewhere in the aforementioned U.S. Provisional Application Ser. No. 60/642,776, filed Jan. 10, 2005.

SUMMARY OF THE INVENTION

Multi-Q FIFO memory systems according to embodiments of the present invention include a plurality of multi-Q first-in first-out (FIFO) memory chips electrically coupled to a data output bus. The plurality of multi-Q FIFO memory chips, which are responsive to respective identification codes ID and respective read chip select signals (/RCS), are configured to support an enhanced multi-chip expansion mode of operation. This expansion mode of operation uses the read chip select signals to control one-at-a-time access of at least two selected multi-Q FIFO memory chips receiving equivalent ID codes and equivalent read addresses to the output data bus during read operations. This one-at-a-time access is achieved because the read chip select signals dispose all but a selected one of the plurality of multi-Q FIFO memory chips in a high impedance output mode (to the output bus) during a read operation. The multi-Q FIFO memory chips are also configured so that a most significant portion of a read address is compared to the ID codes associated with the plurality of multi-Q FIFO memory chips to detect multiple equivalencies therebetween during a read operation. This allowance for multiple equivalencies supports greater queue expansion relative to FIFO memory systems requiring uniqueness between an ID code of a chip and a most significant portion of the read address.

Further embodiments of the present invention include methods of operating a depth-expanded system of multi-Q FIFO memory chips coupled to a common data output bus. These methods include comparing bits (e.g., most significant bits) of an applied read address to ID codes associated with the multi-Q FIFO memory chips to thereby identify a plurality of equivalencies (i.e., identify a plurality of the multi-Q FIFO memory chips as candidates to undergo a read operation). A step is then performed to deselect all but one of the candidate multi-Q FIFO memory chips using a plurality of read chip select signals to dispose data output ports of the deselected multi-Q FIFO memory chips in high impedance states that preclude competing use of the output bus.

Additional embodiments of the present invention include multi-Q FIFO memory devices that are configured to support a backed-off standard (BOS) mode of operation. This mode of operation enables automatic re-reading of at least one data word previously read from a first queue in the FIFO memory chip during a first FIFO read operation, in response to a queue-switch back to the first queue during a second FIFO read operation. To support this mode of operation, a read counter associated with the first queue is backed-off at least one entry position in response to the queue-switch. This BOS mode supports a method of operating a multi-queue FIFO memory chip, whereby first data can be read from a first queue in the multi-queue FIFO memory chip to an output bus during an operation to switch reading from the first queue to a second queue. Second data is then read from the second queue to the output bus during an operation to switch reading from the second queue to the first queue. Thereafter, at least a portion of the first data previously read from the first queue to the output bus is re-read to the output bus to thereby support a backed-off standard mode of operation associated with the first queue. To support this re-reading, a count in a read counter associated with the first queue is automatically adjusted backward.

Figure 1A:
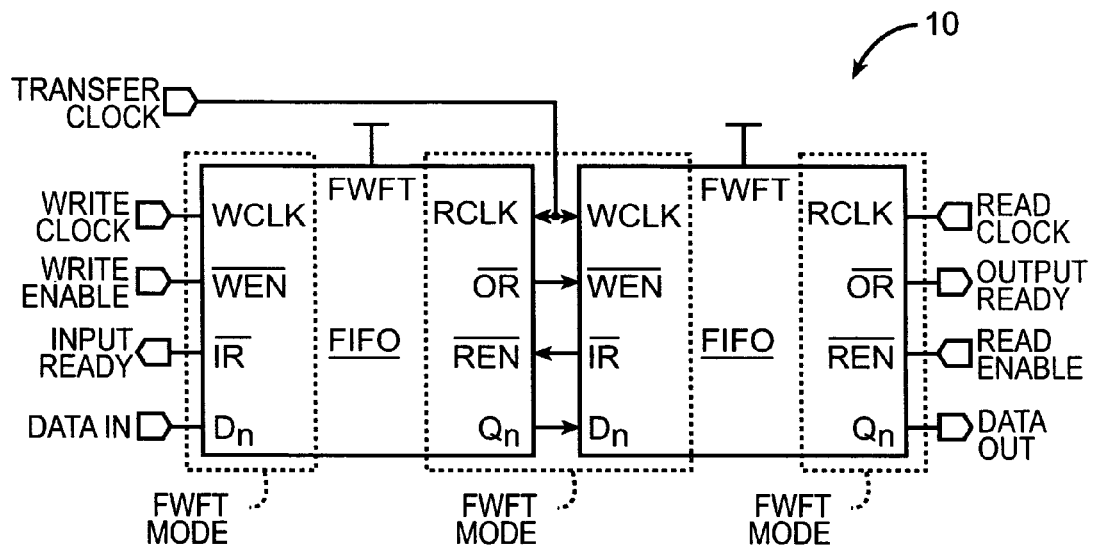
FIG. 1A illustrates a pair of conventional FIFO memory devices that are arranged in a depth expansion configuration and support conventional first-word fall-through (FWFT) mode operation.

DESCRIPTION OF PREFERRED
EMBODIMENTS

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix B (or prefix symbol "/") to a signal name may also denote a complementary data or information signal or an active low control signal, for example.

Figure 3A:
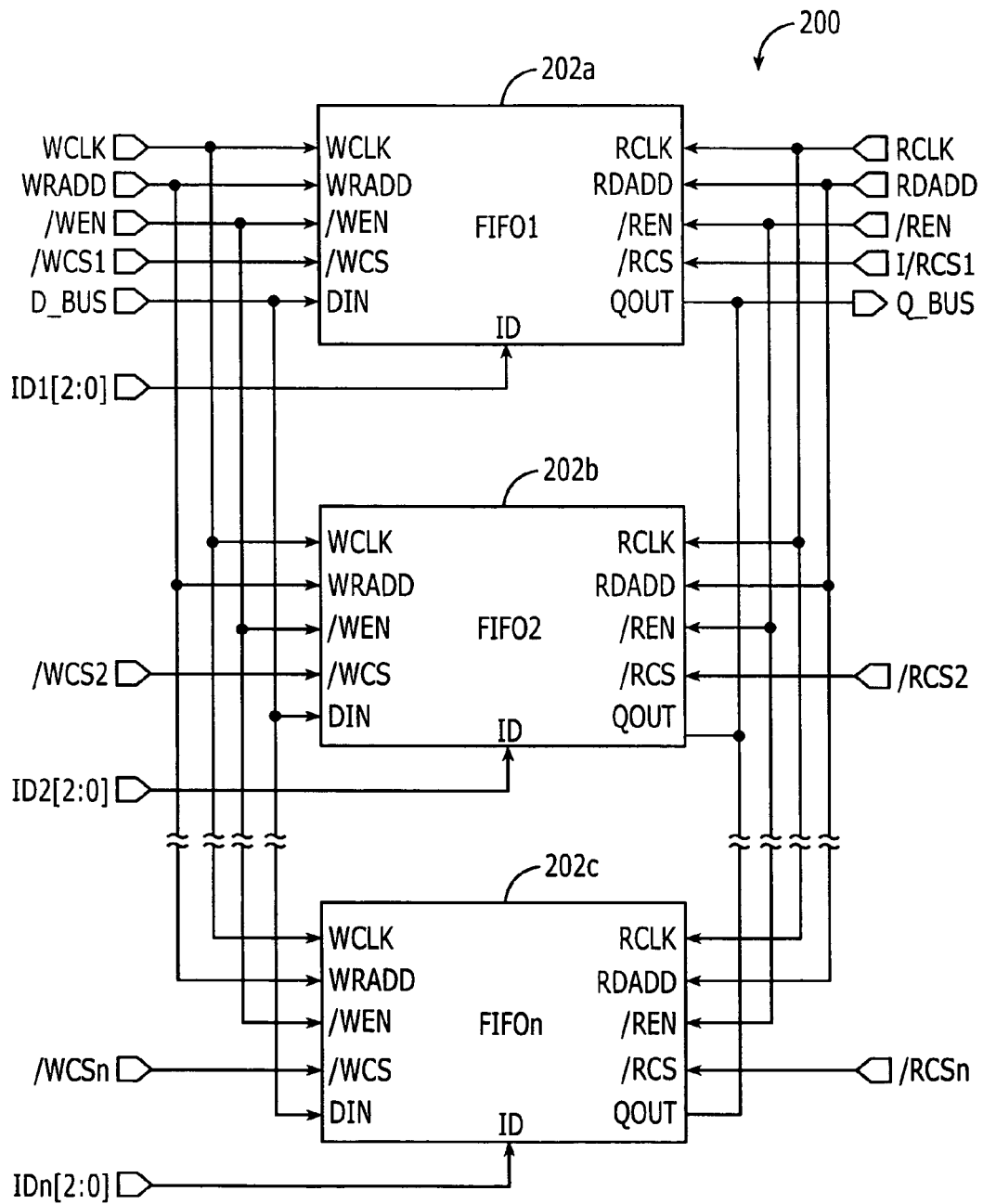
FIG. 3A illustrates a plurality of first-in first-out (FIFO) memory devices arranged as an expanded FIFO memory system that utilizes ID codes and chip select signals to identify devices being addressed during write and read operations, according to embodiments of the present invention.
Figure 3B:
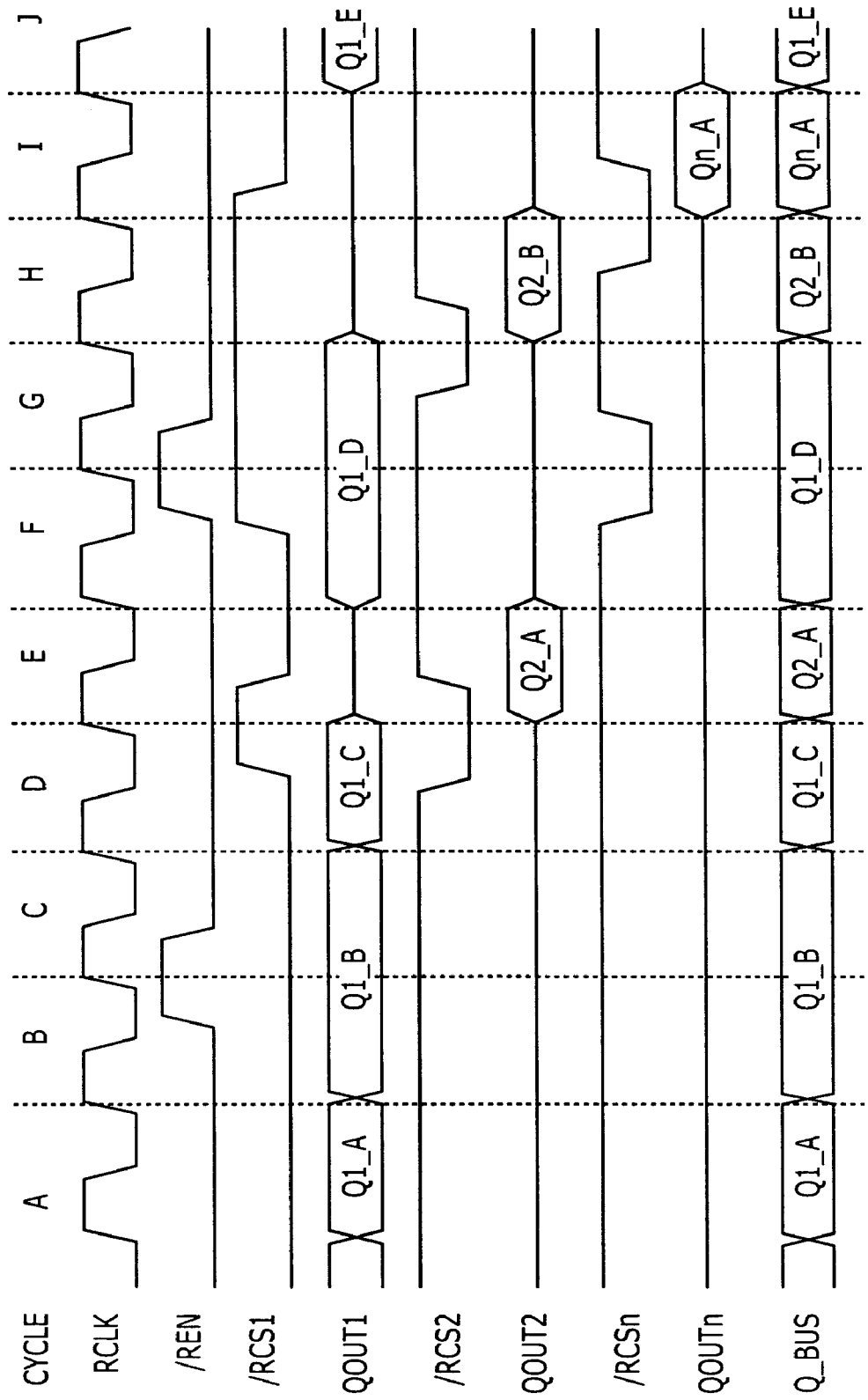
FIG. 3B is a timing diagram that illustrates operation of the FIFO memory system of FIG. 3A.

FIGS. 3A-3B illustrate operations performed by an expandable multi-queue FIFO memory system 200 that utilizes ID codes and chip select signals to select devices being addressed during write and read operations. The FIFO memory system 200 of FIG. 3A includes a plurality of FIFO memory devices 202a-202c that receive write data from a common input bus (D_BUS) and output read data to a common output bus (Q_BUS) during write and read operations, respectively. Each of these FIFO memory devices 202a-202c may include a packaged integrated circuit chip(s) that performs the FIFO operations described herein. Each of the integrated circuit chips may include cache memory and high capacity supplemental memory in the form of embedded memory. This memory may be configured with control logic to support multiple queues within each chip. In alternative embodiments, high capacity supplemental memory may be provided by separate integrated circuit chips (e.g., DRAM memory chips). Examples of cache and supplemental memories that may be used in FIFO memory devices are more fully disclosed in commonly assigned U.S. Pat. Nos. 6,546,461 and 6,754,777 and in commonly assigned U.S. application Ser. Nos. 10/721,974, filed Nov. 24, 2003, the disclosures of which are hereby incorporated herein by reference.

Figure 1B:
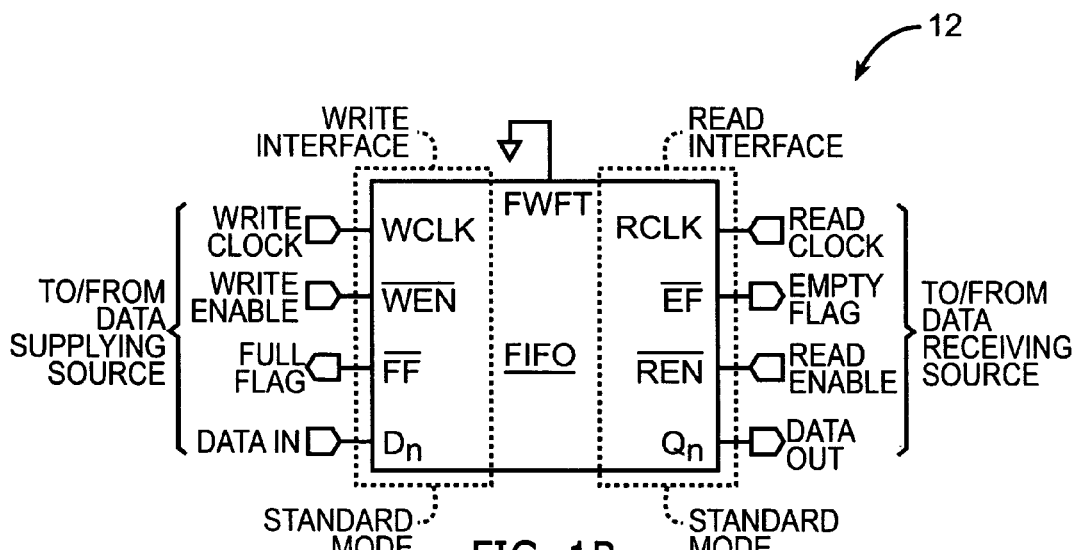
FIG. 1B illustrates a conventional FIFO memory device that is disposed in a conventional standard mode operation.
Figure 2:
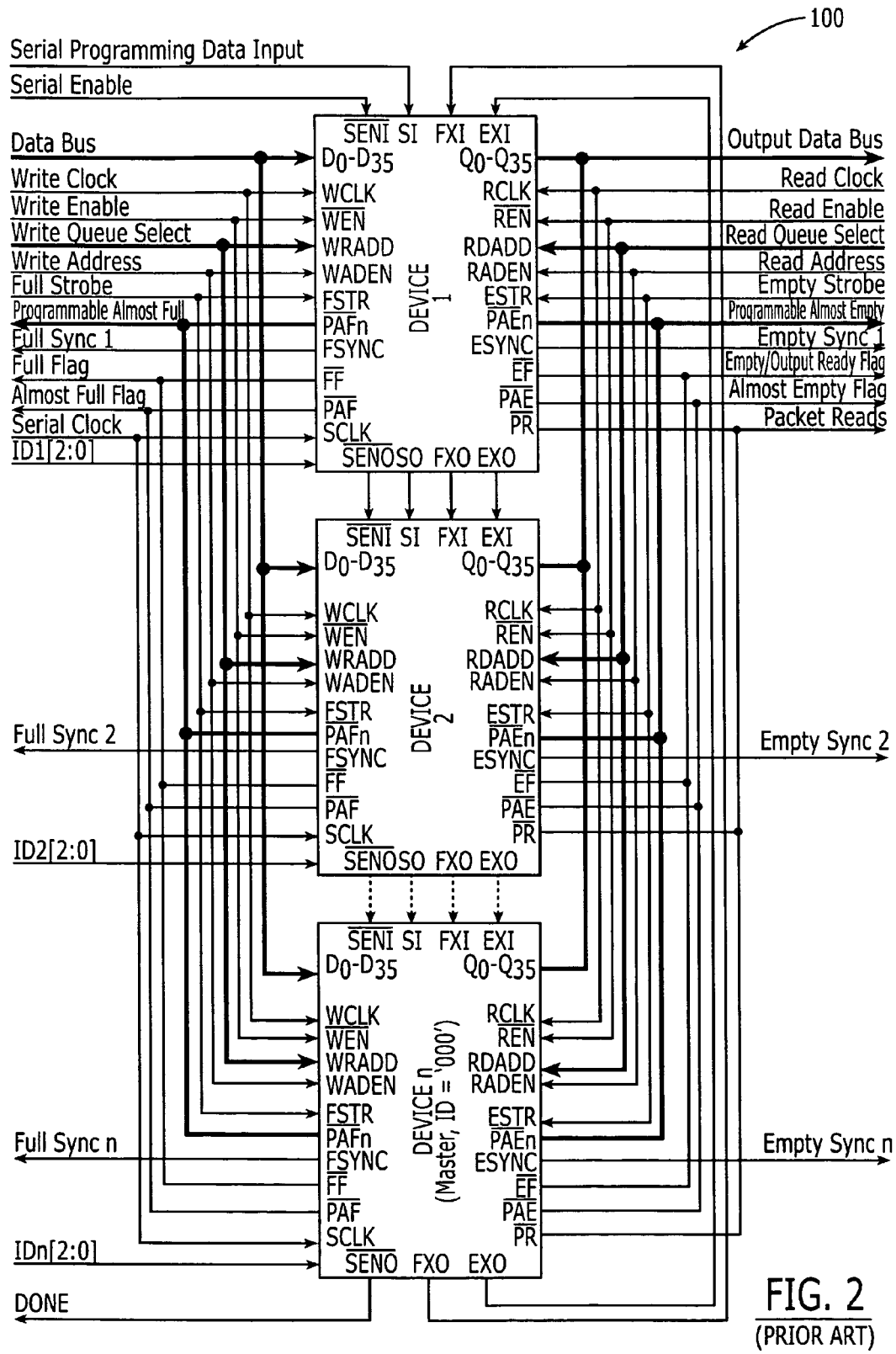
FIG. 2 illustrates a plurality of first-in first-out (FIFO) memory devices arranged as an expanded FIFO memory system that utilizes ID codes to identify devices being addressed during write and read operations, according to the prior art.

The write side of each of the FIFO memory devices 202a-202c is responsive to at least a write clock signal (WCLK), an active low write enable signal (/WEN), a write "queue" address (WRADD) and an active low write chip select signal (/WCS). The data input terminals (DIN) of the FIFO memory devices 202a-202c are commonly connected to the input bus (D_BUS), which supplies write data during FIFO write operations. As will be understood by those skilled in the art, additional write side signals and flags, such as those illustrated in FIG. 1, may be received and generated by the FIFO memory devices 202a-202c. Similarly, the read side of each of the FIFO memory devices 202a-202c is responsive to at least a read clock signal (RCLK), an active low read enable signal (/REN), a read "queue" address (RDADD) and an active low read chip select signal (/RCS). The data output terminals (QOUT) of the FIFO memory devices 202a-202c are commonly connected to the output bus (Q_BUS), which receives read data during FIFO read operations. As will be understood by those skilled in the art, additional read side signals and flags, such as those illustrated in FIG. 1, may be received and generated by the FIFO memory devices 202a-202c.

The FIFO memory devices 202a-202c may be responsive to respective ID codes, which are shown as ID[2:0], ID2[2:0], . . . , IDn[2:0]. In contrast to the ID codes illustrated by FIG. 1, the values of the ID codes illustrated by FIG. 3A need not be unique to each FIFO memory device 202a-202c. For example, the first and second FIFO memory devices 202a-202b may belong to the same class of queues, which occurs when ID1[2:0]=ID2[2:0]. The ID codes ID1-IDn are used in combination with the write chip select signals /WCS1-/WCSn to identify a unique one of the FIFO memory devices 202a-202c during an operation to write data to an addressed queue specified by the write address WRADD. In alternative embodiments of the present invention, the write chip select signals may be independently used to uniquely identify a FIFO memory device during a write operation. The write address WRADD may serve to identify a class of queues associated with a FIFO memory device as well as a specific queue within the class. For example, if the write address WRADD is an 8-bit address, the three most significant bits of WRADD (i.e., WRADD[7:5]) may be used to specify one of eight possible classes and the five least significant bits of WRADD (i.e., WRADD[4:0]) may be used to specify one of 32 possible queues within a class. In this case, the three most significant bits of WRADD may be compared with the ID code associated with each FIFO memory device 202a-202c to identify which FIFO memory device(s) has been selected for a respective write operation. Because this comparison may identify more than one of the FIFO memory devices 202a-202c as a candidate for a respective write operation, the write chip select signals /WCS1-/WCSn are used to select a unique FIFO memory device based on the constraint that only one of the write chip select signals /WCS1-/WCSn may be asserted (i.e., set low) at a time. Moreover, if ID codes are not used, the entire write address WRADD may be used to specify one of 256 queues within a FIFO memory device.

The same ID codes ID1-IDn are also used in combination with the read chip select signals /RCS1-/RCSn to identify a unique one of the FIFO memory devices 202a-202c during an operation to read data from an addressed queue specified by the read address RDADD. However, in alternative embodiments of the present invention, the use of ID codes may be eliminated and the read chip select signals may be used to uniquely identify one of a plurality of FIFO memory devices during a read operation. The read address RDADD may serve to identify a class of queues associated with a FIFO memory device as well as a specific queue within the class. As described above with respect to the write address WRADD, the read address RDADD can be an 8-bit address. The three most significant bits of RDADD (i.e., RDADD[7:5]) may be used to specify one of eight possible classes and the five least significant bits of RDADD (i.e., RDADD[4:0]) may be used to specify one of 32 possible queues within a class. The three most significant bits of RDADD may be compared with the ID code associated with each FIFO memory device 202a-202c to identify which FIFO memory device(s) has been selected for a respective read operation. Because this comparison may identify more than one of the FIFO memory devices 202a-202c as a candidate for a respective read operation, the read chip select signals /RCS1-/RCSn are used to select a unique FIFO memory device based on the constraint that only one of the read chip select signals /RCS1-/RCSn may be asserted (i.e., set low) at a time. If ID codes are not used, the entire read address RDADD may be used to specify one of 256 queues within a FIFO memory device.

The timing diagram of FIG. 3B illustrates the reading of data from various queues within the FIFO memory devices 202a-202c to the output data bus Q_BUS during the read cycles A-J. This timing diagram illustrates a read clock signal RCLK and an active low read enable signal /REN, which are received by each of FIFO memory devices 202a-202c. The read enable signal /REN controls whether any of the FIFO memory devices are active during a read cycle and the read chip select signals /RCS1, /RCS2 and /RCSn control which one of the FIFO memory devices 202a-202c is active when the read enable signal /REN is also active. Only one of the read chip signals can be asserted (e.g., low) at a time. When a read chip select signal is inactive at a high level (i.e., /RCS=1), the output terminals (QOUT) of a respective FIFO memory device are disposed in a high impedance state.

As illustrated by read cycles A-B, setting /REN and /RCS1 low and setting /RCS2 and /RCSn high will operate to select the first FIFO memory device 202a during a FIFO read operation. This selection will cause the FIFO read data Q1_A and Q1_B (from a queue identified by RDADD) to be passed from the output terminals (QOUT1) of the first FIFO memory device 202a to the output bus Q_BUS. The read data Q1_B is then held on the output bus Q_BUS during read cycle C, because the read enable signal is inactive (/REN=1) when read cycle C commences. Thereafter, during read cycle D, additional read data is transferred from the output terminals QOUT1 of the first FIFO memory device 202a to the output bus Q_BUS. This transfer occurs because the read enable signal /REN and the read chip select signal /RCS1 are both low when read cycle D commences (e.g., rising edge of RCLK for cycle D is received).

During read cycle E, read data Q2_A is transferred from the output terminals QOUT2 of the second FIFO memory device 202b to the output bus Q_BUS. This transfer occurs because the read enable signal /REN is low and the read chip select signal /RCS2 is low when the read cycle E commences. During read cycle F, read data Q1_D is transferred from the output terminals QOUT1 of the first FIFO memory device 202a to the output bus, in response to the condition that /REN and /RCS1 are both low at the commencement of the read cycle F. This read data Q1_D is held on the output bus Q_BUS during read cycle G because the read enable signal /REN is inactive when the read cycle G commences and this inactive state overrides the fact that the read chip select signal /RCSn for the last FIFO memory device 202c is low when the read clock signal RCLK switches low-to-high during cycle G. When read cycle H commences, the read chip select signal /RCS2 and the read enable signal /REN are both low. This condition causes read data Q2_B to be transferred from the output terminals QOUT2 of the second FIFO memory device 202b to the output bus Q_BUS. Likewise, during read cycle 1, the read chip select signal /RCSn and the read enable signal /REN are both low, which causes read data Qn_A to be transferred from the output terminals QOUTn of the last FIFO memory device 202c to the output bus Q_BUS. Finally, during read cycle J, read data Q1_E is transferred from the output terminals QOUT1 to the output bus Q_BUS because /RCS1 and /REN are both low when the leading edge of RCLK for cycle J is received.

Each of the above-described multi-queue FIFO memory devices 202a-202c may be further configured to support a backed-off standard (BOS) mode of operation during read operations. This backed-off standard mode of operation enables the automatic re-reading of data that was previously output to a data bus during a tail end of a queue switch operation that may incur multiple cycles of queue switch latency. In particular, a multi-queue first-in first-out (FIFO) memory device is provided that supports both a standard mode of operation, which is a conventional mode of operation, and an additional backed-off standard (BOS) mode of operation, which is configurable on a per-queue basis (e.g., some queues may support standard mode operation and others may support backed-off standard mode operation). This backed-off standard mode of operation enables re-reading of at least one data word previously read from a first queue in the FIFO memory device during a first FIFO read operation. This re-reading occurs automatically in response to a queue-switch back to the first queue during a second FIFO read operation. This at least one previously read data word may be a data word that was not properly captured (i.e., missed) by a downstream device receiving read data from the FIFO memory device during the first FIFO read operation. This first FIFO read operation occurs during a queue switch away from the first queue (i.e., queue switch to another queue). In some of these embodiments, the backed-off standard mode of operation may be supported using FIFO control logic configured to back-off (e.g., decrement) an internal read counter associated with a first queue by at least one count value (e.g., entry position) in response to a queue switch from the first queue to another queue. A switch-back to the first queue will then commence reading from the entry associated with the decremented read count value and thereby support re-reading of data from the first queue.

Aspects of the backed-off standard (BOS) mode of operation are illustrated more fully by the timing diagrams of FIGS. 4A-4D, which illustrates four different timing scenarios. These timing diagrams assume that the final operations to read from a current queue continue for four (4) "queue switch" cycles (e.g., QS-1, QS0, QS1, QS2) in response to a queue switch event and that data read from an "old" queue during QS2 will be output (e.g., to a bus) during the next cycle (i.e., QS3) and, similarly, that data read from a "new" queue during QS3 will commence output during the next cycle (i.e., QS4).

Figure 4A:
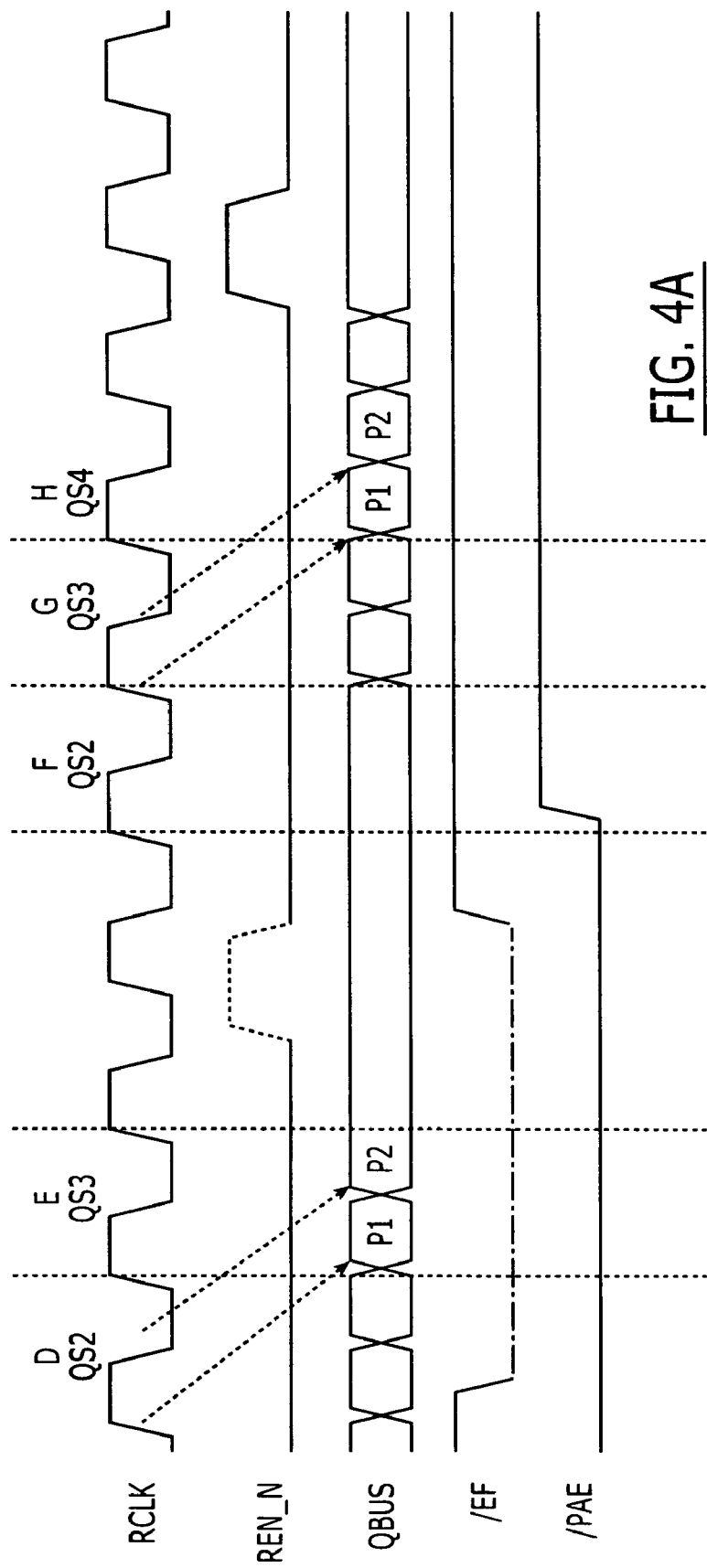
FIG. 4A is a first timing diagram that illustrates a backed-off standard mode of operation in the FIFO memory system of FIG. 3A during multiple queue switch cycles.

FIG. 4A is a timing diagram that illustrates read operations performed by the FIFO memory device during a queue switch operation from one queue (e.g., a first queue) to another queue (e.g., a second queue) and a subsequent queue-switch operation back to the one queue. This timing diagram includes the timing of a read clock RCLK, an active low read enable signal REN_N, an active low empty flag /EF and an active low programmable almost empty flag /PAE. The reference QBUS designates the status of read data on an output bus, which may be shared by the multiple queues within the FIFO memory device and even multiple FIFO memory devices in a multi-chip system. The reference characters D, E, F, G and H represent individual cycles of the read clock RCLK. The cycle D, shown as QS2, represents the last of a four-cycle queue switch operation during which read data from a now "old" queue (e.g., first queue) is latched and passed in the following cycle E, shown as QS3, to the shared output bus QBUS. Data (not shown) from the new queue (e.g., second queue) will also be latched during cycle E. The read data from the old queue is illustrated as words P1 and P2. These words are acquired at a DDR rate in-sync with immediately adjacent rising and falling edges of a cycle of RCLK. The high-to-low transition of the empty flag /EF during cycle D indicates that the newly selected queue is empty. The active low status of the read enable signal REN_N indicates that the read operations from the now "old" queue were enabled (e.g., by a downstream receiving device). Cycle F, shown as QS2, represents the last cycle for latching data from the current queue (i.e., new queue in cycle E) and cycle G represents the first cycle for latching data from the just selected queue, which is illustrated herein as the same "first" queue associated with cycle D. As illustrated by cycle H, the words P1 and P2, which are latched in cycle G, are output to the output bus QBUS. The reading of these words P1 and P2 represents an automatic re-reading of the same words previously output during a tail end of a prior queue switch operation (e.g., during cycles D and E). This automatic re-reading occurs in response to decrementing the read counter (e.g., read pointer) associated with the first queue during the prior queue switch operation.

Figure 4B:
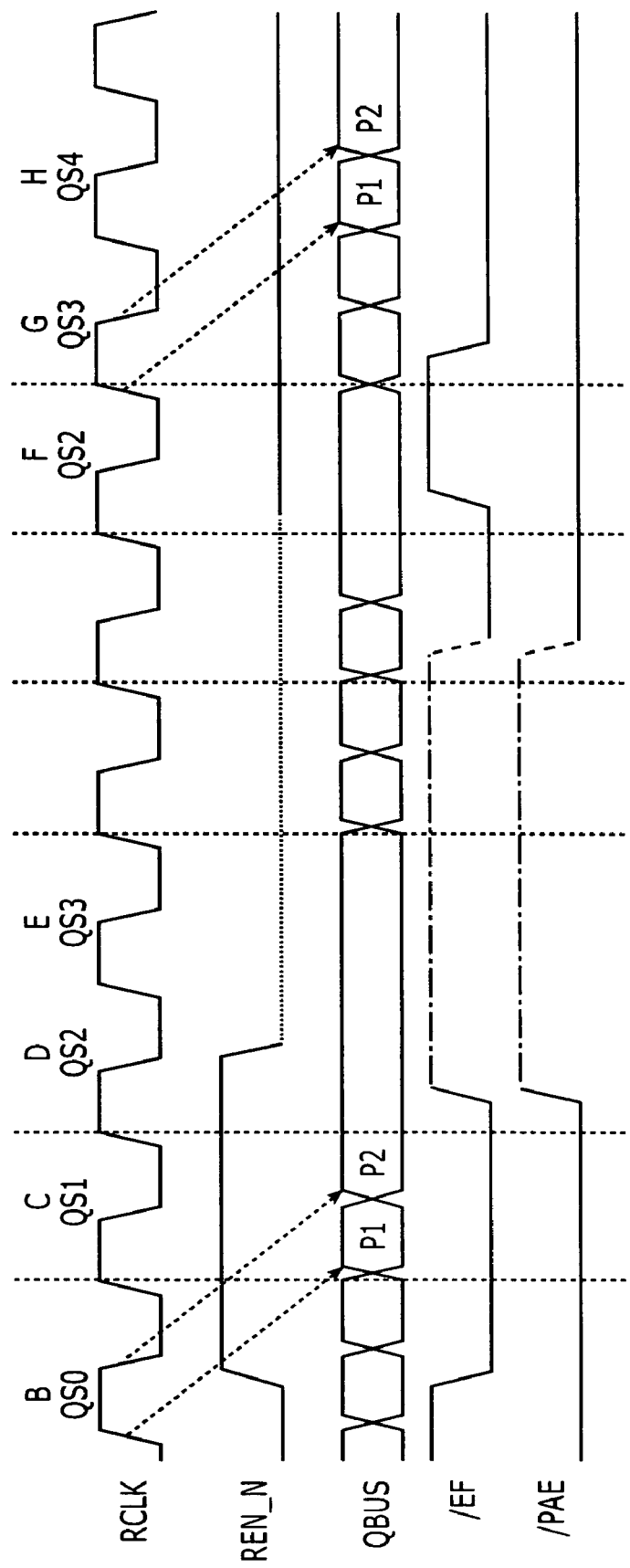
FIG. 4B is a second timing diagram that illustrates a backed-off standard mode of operation in the FIFO memory system of FIG. 3A during multiple queue switch cycles.

FIG. 4B is a timing diagram that illustrates read operations performed by the FIFO memory device during a queue switch operation from one queue (e.g., a first queue) to another queue (e.g., a second queue) and a subsequent queue switch operation back to the one queue (from the second queue or another queue). The reference characters B, C, D, E, F, G and H represent individual cycles of the read clock RCLK. The cycle C, shown as QS1, represents a third cycle within a four-cycle queue switch operation during which latched read data (P1 and P2) from a now "old" queue (e.g., first queue) is passed to the shared output bus QBUS. However, the inactive state of the read enable signal REN_N at a beginning of cycle C signifies that a corresponding downstream receiving device is not ready to receive the latched read data. The cycles B and C also occur when the empty flag /EF reflects an empty status of the first queue and cycle D occurs when the empty flag /EF reflects a non-empty status of the second queue. Cycle E, shown as QS3, also reflects a cycle during which read data from the second queue is initially latched in response to the queue switch operation and then output in a following cycle. Cycles F, G and H reflect a transition from the second queue back to the first queue and an automatic re-reading of the previously output read data (P1 and P2) from the first queue. This read data is latched during cycle G (QS3) and then passed to the output bus QBUS during cycle H (QS4). During cycle F, the empty flag associated with the first queue is inactive to reflect the fact that the first queue, which was previously indicated as empty, is no longer empty because the read counter associated with the first queue was decremented to support the backed-off mode of operation.

Figure 4C:
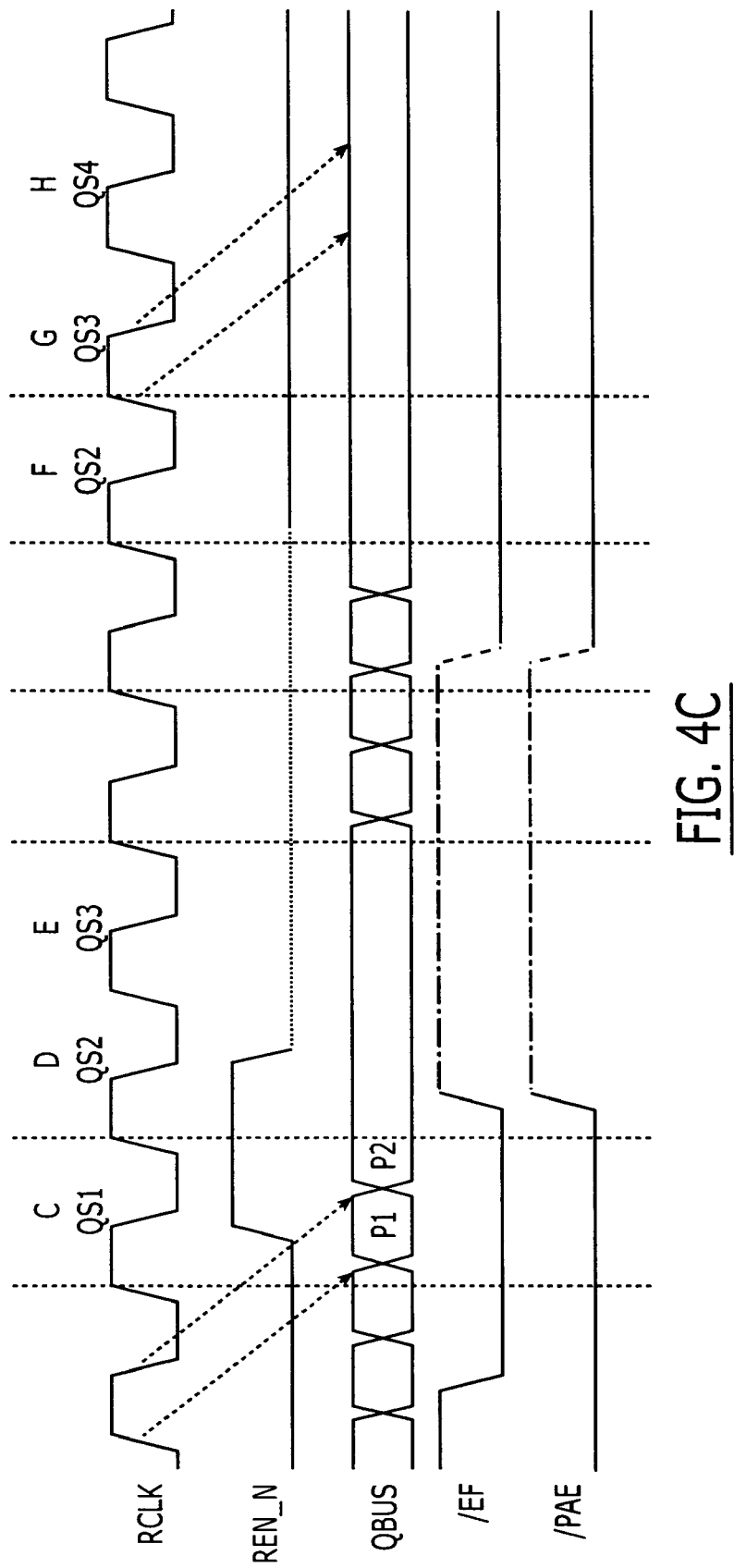
FIG. 4C is a third timing diagram that illustrates a backed-off standard mode of operation in the FIFO memory system of FIG. 3A during multiple queue switch cycles.
Figure 4D:
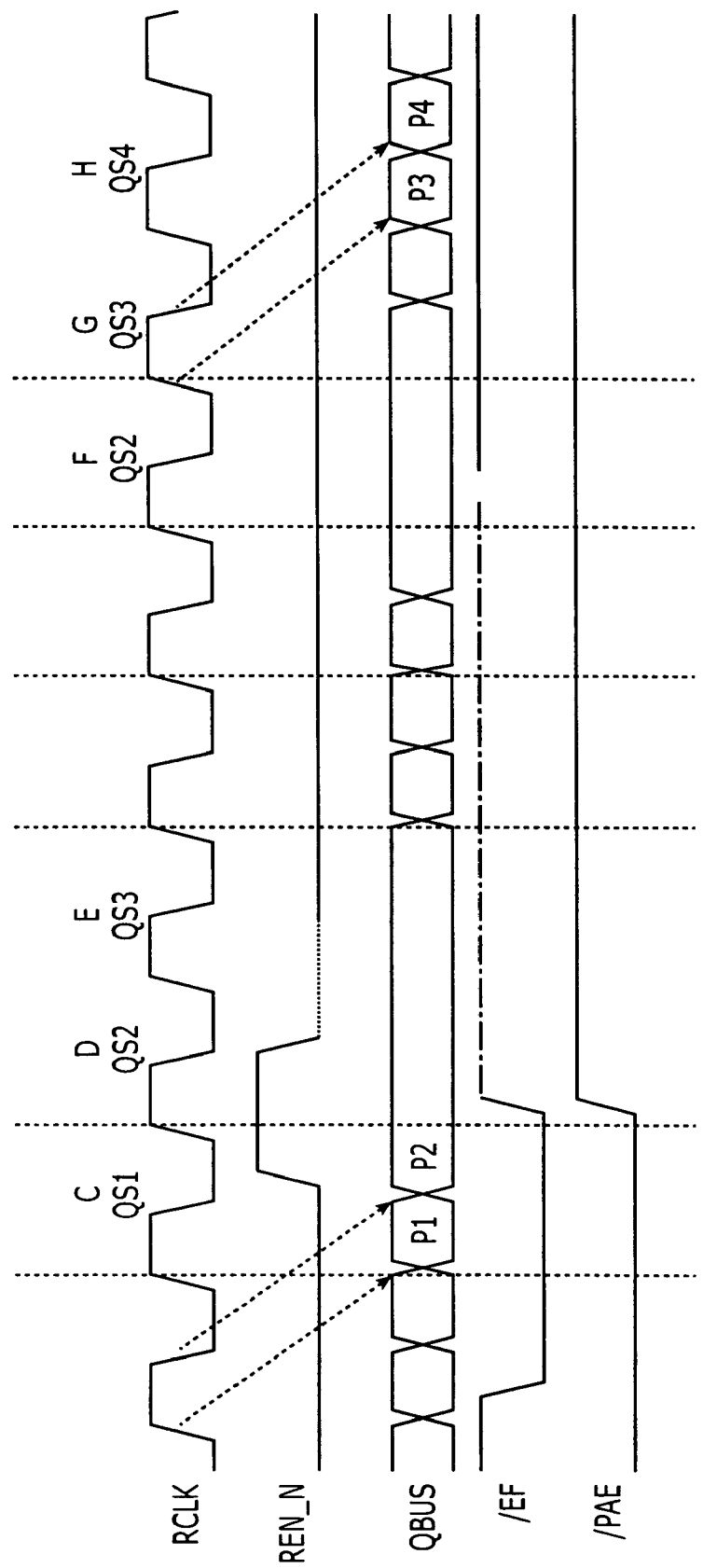
FIG. 4D is a fourth timing diagram that illustrates a backed-off standard mode of operation in the FIFO memory system of FIG. 3A during multiple queue switch cycles.

The timing diagram of FIG. 4C is similar to the timing diagram of FIG. 4B, however, the read enable signal REN_N is shown as being active during cycle C (QS1) to reflect the fact that a downstream receiving device is active to receive the last two words (P1 and P2) stored in the first queue. The high-to-low switching of the empty flag /EF prior to cycle C also indicates that words P1 and P2 are the last two words within the first queue. Because these words P1 and P2 are latched during an early cycle (e.g., QS0) of a queue switch operation and then output to the output bus QBUS during QS1 when REN_N is active, these words are not candidates for automatic re-reading when a queue switch operation returns to the first queue during cycles G and H. This timing condition contrasts with the timing condition shown in FIG. 4A, where the words P1 and P2 are output at a tail end of a queue switch operation when they are most likely to be missed or unusable to a downstream receiving device. The timing diagram of FIG. 4D is similar to the timing diagram of FIG. 4C, however the timing diagram of FIG. 4D has been modified to reflect the fact that the first queue has received additional write data after the initial queue switch illustrated by cycles C, D and E and is no longer empty. This additional write data is illustrated by the words P3 and P4, which are latched during cycle G (QS3) and output to the output bus QBUS during cycle H (QS4), which reflect a switchback to the first queue.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit device, comprising:
 a multi-queue first-in first-out (FIFO) memory chip configured to support a plurality of independently addressable FIFO queues and a corresponding pair of read and write counter values associated with each of the plurality of FIFO queues, said FIFO memory chip further configured to support a backed-off standard mode of operation in at least one of the plurality of FIFO queues, said backed-off standard mode of operation configured to:

enable automatic re-reading of at least one data word previously read from a first one of the plurality of FIFO queues in said FIFO memory chip during a first FIFO read operation, in response to a read queue-switch from a second one of the plurality of FIFO queues back to the first one of the plurality of FIFO queues; and generate a backed-off read counter value associated with the first one of the plurality of FIFO queues when performing a read queue-switch from the first one of the plurality of FIFO queues to another one of the plurality of FIFO queues.

2. The device of claim 1, wherein the backed-off standard mode of operation is programmable on a per queue basis.

3. The device of claim 1, wherein generation of the backed-off read counter value associated with the first one of the plurality of FIFO queues comprises decrementing a read counter associated with the first one of the plurality of FIFO queues.

4. An integrated circuit device, comprising:
a multi-queue first-in first-out (FIFO) memory chip configured to support a plurality of independently addressable FIFO queues and a corresponding pair of read and write pointers associated with each of the plurality of FIFO queues, said FIFO memory chip further configured to support a backed-off standard mode of operation in each of the plurality of FIFO queues that is programmable on a per queue basis, said backed-off standard mode of operation comprising an operation to automatically generate a decremented read pointer associated with a first one of the plurality of FIFO queues in response to a read queue switch from the first one of the plurality of FIFO queues to a second one of the plurality of FIFO queues having read and write pointers that are independently controllable relative to the read and write pointers associated with the first one of the plurality of FIFO queues.

5. The device of claim 4, wherein said multi-queue FIFO memory chip is configured to support queue switch operations having N cycles of latency, where N is a positive integer greater than one; and wherein said multi-queue FIFO memory chip is further configured so that the read pointer associated with the first one of the plurality of FIFO queues is automatically decremented by a value in a range from one-to-N when switching a read queue from the first one of the plurality of FIFO queues to another one of the plurality of FIFO queues.

* * * * *